Sept. 14, 1965  W. S. PEPPLER  3,206,001
SUPPORT PLATE FOR CONVEYORS
Filed Jan. 10, 1964
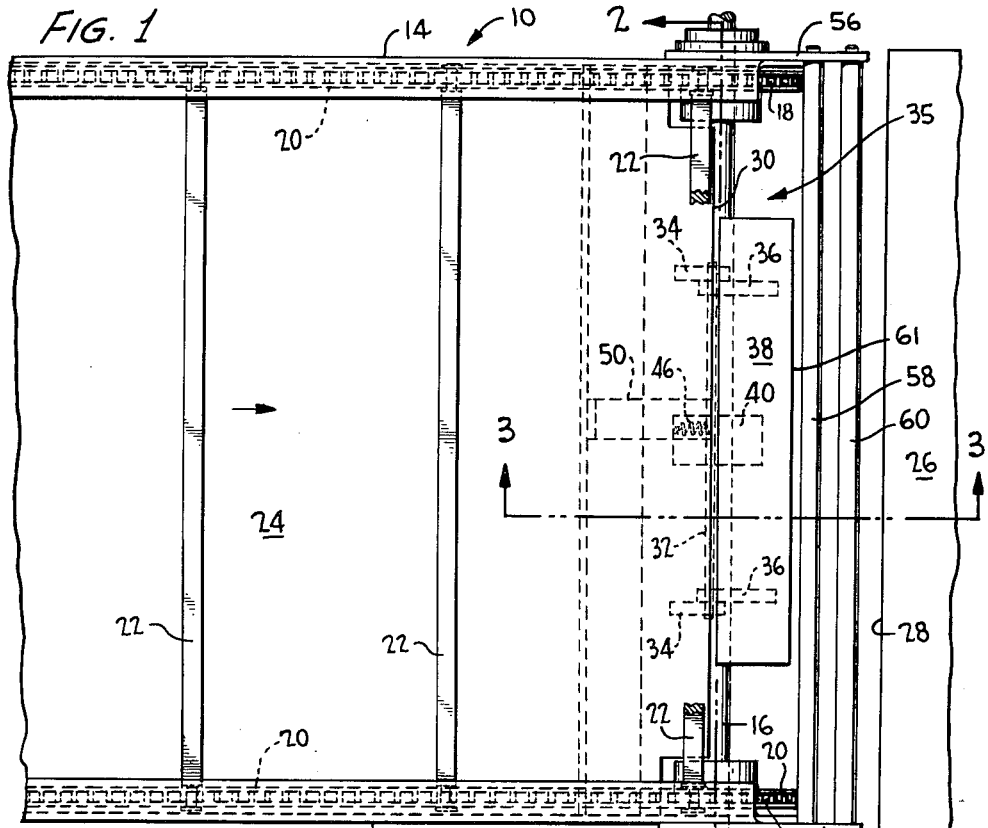
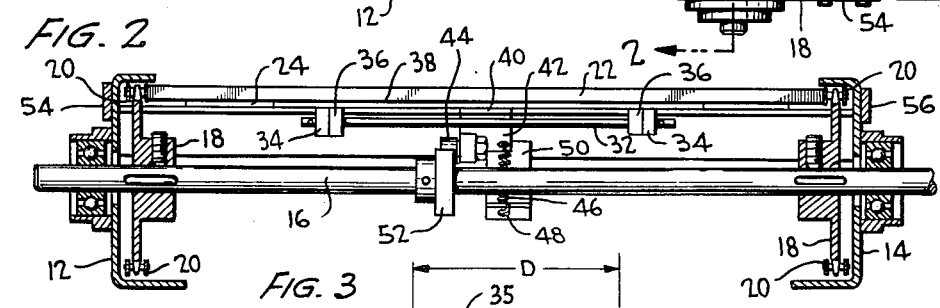
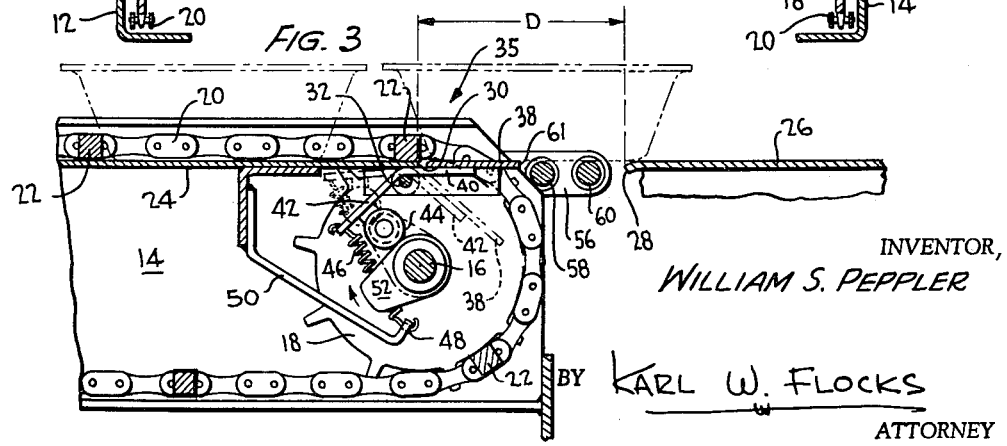
INVENTOR,
WILLIAM S. PEPPLER
BY KARL W. FLOCKS
ATTORNEY

3,206,001
SUPPORT PLATE FOR CONVEYORS

William S. Peppler, Chappaqua, N.Y., assignor to Diamond International Corporation, a corporation of Delaware
Filed Jan. 10, 1964, Ser. No. 336,999
4 Claims. (Cl. 198—102)

This invention relates generally to conveyor attachments and particularly to a conveyor utilized with wrapping apparatus of the character disclosed in U.S. application Serial No. 215,414 filed August 7, 1962. In apparatus of the character disclosed in the application mentioned above, the trays are wrapped with a shrink film and are thereafter conveyed into a heat-shrink tunnel where jets of hot air shrink the film to the contours of a tray and the articles being packaged.

The trays which form the base for the package wrapped with a shrink film, are generally dispensed one-by-one from denesting apparatus, and are conveyed in a straight, continuous motion along a conveyor to the wrapping apparatus mentioned above.

One of the problems of conveying a tray to be subsequently wrapped is the movement of the loaded tray from one conveyor to the next without spilling the tray contents, such as fruit, etc.

A primary object of the present invention is to provide novel displaceable support means for bridging the gap between in-aligned conveyors.

A further object of the present invention is to provide a novel displaceable support means for bridging the gap between endless conveyors, and particularly adapted for use with endless conveyors having transverse pusher bars for engaging the rear edge of an article being conveyed.

A still further and more specific object of the present invention is to provide a novel displaceable support plate which is hingedly mounted for vertical pivotal movement beneath a horizontal plane in relation to movement of transverse pusher bars on an endless conveyor.

And yet another object of the present invention is to provide a displaceable support plate normally disposed in a horizontal position and substantially coplanar relation with respect to a conveyor dead plate, and mechanically displaced in relation to transverse pusher bars disposed on the endless conveyor when the pusher bars reach a predetermined position adjacent the end of the conveyor toward which the endless conveyor is moving.

These together with other and more specific objects will become apparent from a consideration of the following specification taken in conjunction with the drawings forming a part thereof, wherein:

FIG. 1 is a fragmentary top plan view showing a fragmentary portion of an endless conveyor which incorporates the displaceable support plate of the invention, portions being broken away for purposes of clarity;

FIG. 2 is a vertical section taken substantially on the plane of line 2—2 of FIG. 1; and FIG. 3 is a vertical section taken substantially on the plane of line 3—3 of FIG. 1.

Referring to the drawing in detail, an endless conveyor is indicated generally at 10 and comprises a pair of opposed, suitably supported frame members 12 and 14 which have extending transversely thereacross suitably journaled support shafts 16 (only the rear shaft being shown) which have fixedly secured in any suitable manner, spaced support sprockets 18 over which are entrained endless conveyor link chains 20. The link chains 20 have suitably secured thereto, at longitudinally spaced intervals therealong, pusher bars 22 which will engage the rear edge of a tray or article to be moved by the conveyor and move it from left to right as viewed in FIG. 1. The pusher bars overlying a fixed dead plate 24; see FIG. 3, suitably secured between the frame members 12 and 14.

An in-line conveyor 26 is disposed in substantially coplanar relation with respect to the dead plate 24 of the conveyor 10 and includes a rear edge 28 which is spaced a distance D; see FIG. 3, from the forward edge 30 of the dead plate 24. The distance D is substantial, and in the absence of the present invention, the loaded trays tend to tip into the space D unless an especially large or relatively long article is being conveyed. The present invention provides a displaceable flapper plate assembly 35 which permits the articles to be readily transferred from the conveyor 10 onto the conveyor 26 in a smooth continuous movement, as well as providing means whereby the pusher bars will not limit the length of the auxiliary support plate or flapper.

The displaceable support plate or flapper assembly 35 includes a support shaft 32 secured at opposite ends in suitable bearing elements 34 secured on the undersurface of the dead plate 24; see FIGS. 1 and 2, and support arms 36 are journaled on the shaft 32, disposed adjacent the elements 34. The arms 36 have secured at the upper surface thereof a flapper or support plate 38 which will normally be disposed on substantially coplanar relationship with respect to the dead plate 24 and conveyor 26. Disposed substantially in the central portion of the plate 38 and secured to the undersurface thereof by means of a leg 40 is one arm of a lever which is integral with a depending angular leg 42. The leg 42 has depending from the undersurface thereof a suitably journaled abutment roller 44, and fixed to the lowermost end of leg 42 is a tension spring 46 which is anchored at 48 to a suitable bracket element 50 depending from an undersurface portion of the dead plate 24 as clearly seen in FIG. 3. Fixedly connected to the shaft 16 is a radially extending abutment or cam element 52 which during each rotation engages the roller 44 to displace the support plate 38 to the phantom line position shown in FIG. 3.

The side frame members 12 and 14 have suitably secured in forwardly extending relationship, in substantial alignment with the dead plate 24 a pair of support arms 54 and 56 having journaled thereacross a pair of support rollers 58 and 60. The rollers 58 and 60 are disposed forwardly of the forward edge 61 of the flapper or support plate 38 to aid in supporting articles on the flapper plate as disposed in the phantom line position of FIG. 3.

Operation

Food trays such as those shown by means of phantom lines in FIG. 3 are dispensed one-by-one onto the dead plate 24 to be engaged by the transverse pusher bars 22. The pusher bars move the trays which have been filled with fruit, etc. toward the in-line conveyor 26. The leading end of the food trays will move onto the flapper 38 and support rollers 58 and 60. As the transverse pusher bar 22 follows the sprockets 18, the pusher plate will move down to the phantom line position shown in FIG. 2 due to engagement of the follower 44 being engaged by the radial camming element 52 rotatable with the shaft 16. The camming element 52 insures a positive mechanical movement of the flapper plate 38, however, this could be eliminated wherein the structure would operate in substantially the same manner, i.e. the transverse pusher bar upon engaging the flapper plate 38 would move it downwardly toward the phantom line position of FIG. 3 against the force of tension spring 46.

Additionally, although the support rollers 58 and 60 are illustrated in the preferred embodiment of the invention, it is aparent that this expedient could be eliminated and the support plate or flapper plate 38 would function for the purpose of supporting trays at the gap between in-lined conveyors.

Obviously, many modifications may be made without departing from the scope of the present invention, and

I claim:

1. In a conveyor for successively moving articles onto a longitudinally spaced, in-lined conveyor, comprising an endless conveyor having an upper and lower run including a plurality of longitudinally spaced, transverse pusher bars, a dead plate disposed beneath the upper run of said conveyor and along which said pusher bars are disposed; the improvement comprising support plate means displaceably supported below and rearwardly of the terminal end of said dead plate and projecting forwardly therefrom in intersection relation with the path of travel defined by said pusher bars, said support plate including means normally biasing the support plate in substantially coplanar relation with said dead plate.

2. In a conveyor for successively moving articles onto a longitudinally spaced, in-lined conveyor, comprising an endless conveyor having an upper and lower run including a plurality of longitudinally spaced, transverse pusher bars, a dead plate disposed beneath the upper run of said conveyor and along which said pusher bars are disposed; the improvement comprising support plate means displaceably supported on said dead plate and projecting forwardly therefrom in the path of travel of said pusher bars, said support plate including means normally biasing the support plate in substantially coplanar relation with said dead plate, said support plate comprising a plate element pivotally supported on an axis of rotation beneath the forward edge of said dead plate, a lever portion depending from said support plate, said means normally urging said support plate in coplanar relation with said dead plate comprising a tension spring engaged with the adjacent terminal end of said depending lever in spaced relation from the axis of rotation of said plate.

3. The structure as claimed in claim 2 in which said lever includes a roller element depending therefrom, said conveyor including a shaft extending parallel to the axis of rotation of said roller element and spaced therefrom, said shaft including a radially extending abutment engageable with said roller element for engaging the same and pivoting said support in opposition to said tension spring for displacing said plate out of engagement with said pusher bars.

4. The structure as claimed in claim 1 in which said conveyor includes a pair of forwardly projecting support elements, and at least one roller element extending transversely between said support elements forwardly of said support plate for engaging an article moved thereon by said pusher bars.

References Cited by the Examiner

UNITED STATES PATENTS

| 1,030,479 | 6/12 | Ofstad | 198—33.4 X |
| 2,202,399 | 5/40 | Riesen | 198—168 |
| 2,338,359 | 1/44 | Sharp | 198—102 |
| 2,806,631 | 9/57 | VanCactor | 198—232 X |
| 2,888,125 | 5/59 | Engelson et al. | 198—102 X |

SAMUEL F. COLEMAN, *Primary Examiner.*